Nov. 2, 1948.    L. B. LINDSLEY    2,452,775
MULTIPLE PNEUMATIC CLUTCH
Original Filed Oct. 19, 1942
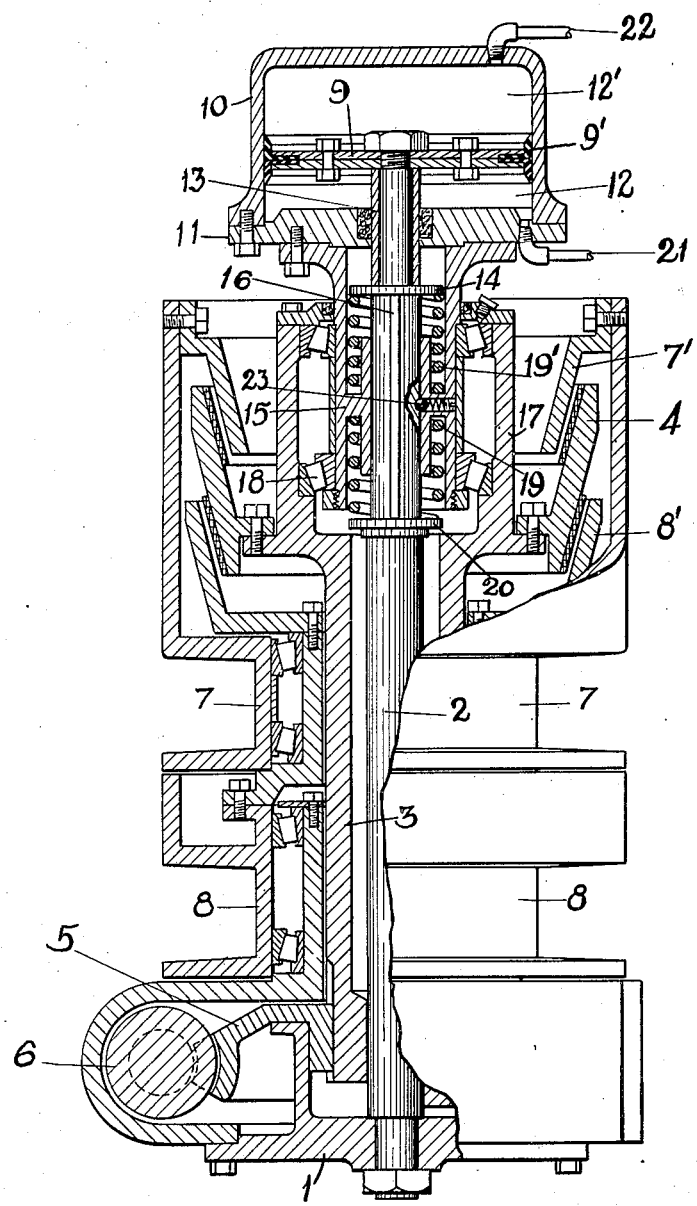
INVENTOR
Lawrence B. Lindsley
By: J. E. Tralmeco
ATTORNEY Patented Nov. 2, 1948

2,452,775

UNITED STATES PATENT OFFICE 2,452,775

MULTIPLE PNEUMATIC CLUTCH

Lawrence B. Lindsley, Los Gatos, Calif., assignor, by mesne assignments, to Wooldridge Manufacturing Company, Sunnyvale, Calif., a corporation of Nevada Original application October 19, 1942, Serial No. 462,636. Divided and this application July 19, 1943, Serial No. 495,372

4 Claims. (Cl. 192—87)

This invention relates to pneumatic clutch controls and it has for its primary object the provision of an improved pneumatically operated dual clutch control for drums or other rotatable devices.

Another object of my invention is to provide an improved pneumatic clutch control having novel means for effecting the selective engagement of a driving member with one of a number of driven members.

Other and further objects of my invention will be pointed out hereinafter, or will be indicated in the appended claims, or will be obvious to one skilled in the art upon an understanding of the present disclosure. For the purpose of this application I have elected to show herein certain forms and details of a pneumatic clutch control representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims, short of the true and most comprehensive scope of the invention in the art.

In the accompanying drawings illustrating the preferred embodiments of my invention the figure is a side elevation, partly in section, of a pneumatic clutch control for selectively effecting the frictional engagement of a driving element with either of two driven elements.

In the embodiment of my invention shown on the drawings there is provided pneumatically controlled means for selectively bringing a driving clutch element into operative engagement with either of two driven clutch elements. A base member 1 supports a non-rotatable stationary vertical shaft 2, and rotatably and slidably supported on the latter is a sleeve 3 having a driving clutch element 4 carried at its upper end. Splined to the lower end of the rotatable sleeve 3 is a worm wheel 5 having a worm gear 6 operatively engaging therewith. The worm gear is rotated in the usual manner by a suitable source of power applied thereto. Mounted for independent rotary movement on the sleeve 3 are drums 7 and 8 which are provided, respectively, with driven clutch elements 7' and 8'. The clutch elements 7' and 8' are so disposed with respect to the driving clutch element 4 that the downward adjustment of the latter will cause its frictional engagement with element 8' while its upward adjustment will cause its frictional engagement with the element 7'. In its neutral position the driving clutch element 4 contacts with neither of the driven clutch elements 7' and 8'.

Secured to the upper end of the vertical shaft 2 is a stationary piston 9 which is positioned inside a vertical reciprocable cylinder or casing 10. The lower side of the cylinder 10 is secured to and closed by a plate 11, while its upper side is closed by a top integral wall. The piston 9 divides the interior of the cylinder 10 into lower and upper air chambers 12 and 12'. The stationary shaft 2 extends axially through the plate 11, and a bushing 13 interposed between the piston 9 and a stationary ring 14 on the shaft provides a bearing surface for the vertical reciprocatory movement of the said plate. Secured as by bolts to the plate 11 is a depending tubular member 15 through which the stationary shaft 2 extends. The tubular member is secured as by vertical splines 16 to the shaft 2 and its vertical reciprocation is thereby permitted but not its rotation.

Positioned in coaxial but spaced relation to the tubular member 15 is an annular upstanding flange 17 secured to and carried by the sleeve 3. Interposed between the flange 17 and the tubular member 15 are a number of roller bearings 18 which permit the rotation of the said flange with respect to the said tubular member.

Coil springs 19 and 19' extending around the shaft 2 and compressed between stationary rings 20 and 14 and the tubular member 15, respectively, normally exert upward and downward pressures of substantially equal intensity upon the said tubular member, the plate 11 and the cylinder 10.

Connecting the chambers 12 and 12' of the cylinder 10 with a suitable source of compressed air are air carrying conduits 21 and 22 which are provided with suitable control means (not shown) for selectively directing compressed air to either of the said chambers.

A spring pressed steel ball 23 carried by the tubular member 15 is adapted to enter a seat or depression in the shaft 2 when the driving clutch element is moved in either direction to its neutral position, thereby causing the said clutch to readily assume and normally retain such position. The positioning of the steel ball 23 in its seat in the shaft will considerably lessen the vibration of the device.

The piston 9 is provided at its periphery with a sealing washer 9' which engages the wall of the cylinder 10 and prevents the escape of air past the piston to or from either of the chambers 12 and 12'.

To bring the driving clutch element 4 into frictional engagement with the driven clutch element 8' air under pressure is directed through the conduit 21 to the air chamber 12 of the cylinder 10. The air pressure in the chamber exerts a downward force upon the plate 11 of the cylinder 10, thereby causing the unit comprising the said plate, the cylinder, the tubular member 15, the roller bearings 18, the rotating flange 17, the rotating clutch element 4, and the rotating sleeve 3 to be forced downwardly against the tension of the coil spring 19. The downward movement of the driving clutch element 4 into operative engagement with the driven clutch element 8' causes the rotation of the latter. The maintenance of suitable air pressure in the chamber 12 of the cylinder 10 will cause the continued rotation of the driven clutch element 8' and the drum 8. The release of the air from the chamber 12 will cause a discontinuance of the downward pressure on the plate 11, thereby enabling the coil spring 19 to exert an upward force capable of returning the aforementioned reciprocable parts of the device to their normal positions wherein the driven clutch element does not engage with the clutch elements 7' and 8'.

To bring the driving clutch element 4 into frictional engagement with the driven clutch element 7', air under pressure is directed through the conduit 22 to the air chamber 12' of the cylinder 10. The air pressure in the chamber exerts an upward force upon the cylinder 10, thereby causing the unit comprising the plate 11, the cylinder 10, the tubular member 15, the roller bearings 18, the rotating flange 17, the rotating clutch element 4, and the rotating sleeve 3 to be forced upwardly against the tension of the coil spring 19'. The upward movement of the driving clutch element 4 into operative engagement with the driven clutch element 7' causes the rotation of the latter. The maintenance of suitable air pressure in the chamber 12' of the cylinder 10 will cause the continued rotation of the driven clutch element 7' and the drum 7. The release of air from the chamber 12' will cause a discontinuance of the upward pressure on the cylinder 10, thereby enabling the coil spring 19' to exert a downward force capable of returning the various aforementioned reciprocable parts of the device to their normal positions wherein the driving clutch element 4 no longer engages with the clutch element 7'.

This is a division of my application previously filed on October 19, 1942, Serial No. 462,636, now Patent Number 2,388,857, and entitled "Pneumatic clutch controls."

I claim:

1. In a pneumatic clutch control, a rotatable drive clutch element, a driven clutch element arranged on each side of the drive clutch element, a stationary shaft concentric with said elements, a reciprocable and non-rotatable member splined to said shaft, said reciprocable member rotatably supporting the drive clutch and adapted to move the latter into engagement with either of the driven clutches, spring means active on both sides of the drive clutch element for holding it in neutral position between the driven clutch elements, a non-rotatable casing mounted on the reciprocable member, a piston slidable in the casing and connected to the stationary shaft, and pneumatic means for actuating the non-rotatable reciprocable member in either direction of its reciprocatory movement for connecting the drive clutch element with either of the driven clutch elements.

2. In a pneumatic clutch control, a plurality of spaced driven clutch elements, a separate rotatable member actuated by each element, a rotatable and reciprocable hollow shaft concentric with said clutch elements and said members, an enclosed casing connected to the hollow shaft, a stationary shaft mounted within the hollow shaft, a stationary piston secured to the stationary shaft and positioned in the casing, said piston dividing the interior of the casing into two air chambers, means connecting the casing to the stationary shaft for holding the casing from rotating while permitting it to be reciprocated, common air inlet and outlet means associated with each chamber for reciprocating the casing and hollow shaft in accordance with the increase and decrease of air pressures in the chambers, a drive clutch mounted on the hollow shaft and disposed between the driven clutch members, the movement of the hollow shaft in one direction caused by a greater air pressure in one of the compartments, moving the driving clutch into operative engagement with one of the driven clutch elements, and the movement of the hollow shaft in the other direction being caused by a greater air pressure in the other compartment and moving the driving clutch into operative engagement with the other driven clutch element.

3. In a pneumatic clutch control, a plurality of spaced driven clutch elements, a separate rotatable member actuated by each element, a rotatable and reciprocable hollow shaft concentric with said clutch elements and said members, an inclosed casing connected to the hollow shaft, a stationary shaft mounted within the hollow stationary shaft, a stationary piston secured to the shaft and positioned in the casing, said piston dividing the interior of the casing into two air chambers, means connecting the casing to the stationary shaft for holding the casing from rotating while permitting it to be reciprocated, common air inlet and outlet means associated with each chamber for reciprocating the casing and hollow shaft in accordance with the increase and decrease of air pressures in the chambers, a drive clutch mounted on the hollow shaft and disposed between the driven clutch members, the movement of the hollow shaft in one direction caused by a greater air pressure in one of the compartments, moving the driving clutch into operative engagement with one of the driven clutch elements, and the movement of the hollow shaft in the other direction being caused by a greater air pressure in the other compartment and moving the driving clutch into operative engagement with the other driven clutch element, spring means for urging the hollow shaft into a position where the driving clutch will be spaced from both of the driven clutch elements, and means including a spring catch for yieldingly holding the hollow shaft in the last mentioned position.

4. In a pneumatic clutch control, a pair of spaced driven clutch elements aligned on a common axis, a driven clutch element aligned on the same axis and arranged to operatively engage either of the driven clutch elements, a stationary shaft aligned with said axis, a tubular member splined to said shaft, a casing forming a pneumatic cylinder and attached to said tubular member, a pneumatic piston rigidly attached to one end of said shaft and operating within said casing, the casing forming closed chambers upon opposite sides of the piston whereby when air under pressure is applied to each of said chambers selectively the casing is caused to move in one direction or the other, a bearing serving to operatively connect the tubular member with said driving clutch element, whereby movement of said tubular member serves to move the driving clutch element into operative engagement with either one of said driven clutch elements, a pair of compression springs surrounding said shaft and within the tubular member, an abutment upon the tubular member upon which adjacent ends of the compression springs are seated, and a pair of spaced abutments upon the shaft upon which the remote ends of the springs engage, said springs serving to normally retain said driving clutch element in an intermediate position in which it is disengaged with respect to both said driven clutch elements.

LAWRENCE B. LINDSLEY.

REFERENCES CITED

The following references are of record in the file of this patent:

UNITED STATES PATENTS

| Number | Name | Date |
| --- | --- | --- |
| 876,609 | Turney | Jan. 14, 1908 |
| 1,362,373 | Turney | Dec. 14, 1920 |
| 1,431,683 | Ramsey | Oct. 10, 1922 |
| 1,520,733 | Turney | Dec. 30, 1924 |
| 1,520,734 | Turney | Dec. 30, 1924 |
| 2,055,970 | Fippard | Sept. 29, 1936 |
| 2,092,580 | Kelley | Sept. 7, 1937 |
| 2,178,280 | Hutchins et al. | Oct. 31, 1939 |
| 2,270,507 | Clark | Jan. 20, 1942 |
| 2,345,531 | DeGanhl | Mar. 28, 1944 |